(12) United States Patent
Bhardwaj

(10) Patent No.: US 7,441,039 B2
(45) Date of Patent: Oct. 21, 2008

(54) METHOD AND APPARATUS FOR ADAPTING MAC AND NETWORK PROCESSOR CORE TO PACKET FORMAT CHANGES AND FOR MAPPING RPR ARCHITECTURE OVER SPATIAL REUSE ARCHITECTURE

(75) Inventor: Sanjay Bhardwaj, Fremont, CA (US)

(73) Assignee: Exar Corporation, Fremont, CA (US)

( * ) Notice: Subject to any disclaimer, the term of this patent is extended or adjusted under 35 U.S.C. 154(b) by 1053 days.

(21) Appl. No.: 10/729,335

(22) Filed: Dec. 4, 2003

(65) Prior Publication Data

US 2005/0125562 A1     Jun. 9, 2005

(51) Int. Cl.
*G06F 15/16* (2006.01)
(52) U.S. Cl. .................... 709/230; 709/249
(58) Field of Classification Search .......... 709/230, 709/249
See application file for complete search history.

(56) References Cited

U.S. PATENT DOCUMENTS

| | | | | |
|---|---|---|---|---|
| 5,414,704 | A * | 5/1995 | Spinney ............... | 370/389 |
| 6,198,751 | B1 * | 3/2001 | Dorsey et al. ........ | 370/466 |
| 7,113,513 | B2 * | 9/2006 | Stoeckl et al. ....... | 370/401 |
| 7,185,062 | B2 * | 2/2007 | Lolayekar et al. ... | 709/213 |
| 2003/0163593 | A1 * | 8/2003 | Knightly .............. | 709/251 |

OTHER PUBLICATIONS

Semiconductor Solution For High Speed Communications and Fiber Optic Applications—Rhea Resilient Ring Processor (Infineon Technologies AG 2002).
A Summary and Overview of the IEEE 802.17 Resilient Packet Ring Standard (RPR Alliance 2002, 2003).
Outline of the IEEE 802.17 RPR Draft Standard—Version 0.3 (An Overview by the Resilient Packet Ring Alliance Jun. 2002).
An Introduction To Resilient Packet Ring Technology (A White Paper by the Resilient Packet Ring Alliance Oct. 2001).
Spatial Reuse Protocol Technology (Cisco—www.cisco.com).
RFC 2892—The Cisco SRP MAC Layer Protocol (D. Tsiang et al., Cisco Systems, Aug. 2000).

* cited by examiner

*Primary Examiner*—Douglas B Blair
(74) *Attorney, Agent, or Firm*—Townsend and Townsend and Crew LLP

(57) ABSTRACT

A data communications device that can operate in accordance with two or more protocols having different data formats and error-protection schemes. The protocol-dependent aspects of the device are handled by a peripheral portion of the device, allowing a substantially protocol-independent core portion that is insulated from protocol changes. Translation and/or adaptation mechanisms in the peripheral portion of the device allow the device to handle changes in data format and/or pipeline changes such as error protection without affecting the core portion of the device. A device and method are provided for inter-operating with both the Spatial Reuse Protocol (SRP) and the Resilient Packet Ring (RPR) architectures.

6 Claims, 9 Drawing Sheets

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| TIME TO LIVE ||||||||| RI | MODE || | PRIORITY ||| P |

FIG. 2

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| TIME TO LIVE ||||||||| RI | MODE || FE | PRTY. || WE | P |

FIG. 3

METHOD AND APPARATUS FOR ADAPTING MAC AND NETWORK PROCESSOR CORE TO PACKET FORMAT CHANGES AND FOR MAPPING RPR ARCHITECTURE OVER SPATIAL REUSE ARCHITECTURE

FIELD OF THE INVENTION

The present invention relates generally to data communications, and more particularly, to packet data communications over networks employing multiple protocols.

BACKGROUND INFORMATION

In the area of data communications networking, among others, hardware implementations are often subject to large scale changes late in the design cycle, putting extreme stress and shock on the methodology and implementation processes. Further, due to constantly evolving standards, such changes may occur more than once and if ignored or not acted upon, the entire design can be rendered incompatible with and unable to inter-work with other vendors' hardware.

Networking is one area in the design of hardware where each vendor's equipment, albeit proprietary, must be able to inter-work with other vendors' equipment. Due to this need, numerous standards bodies and forums exist where representatives of the vendors at the box, chip and wire level meet and devise manifold protocols. Due to the involvement of multiple vendors, often with competing needs, the protocol and specification development process is a long and tedious one with changes happening very often. Therefore there is a need for a mechanism that is readily adaptable to such changes while isolating the core design from these changes.

One aspect of a data communications network that is commonly subject to such changes is the format of data packets carried thereon. The packet format is the format in which a payload is packed at a transmitter so that it can be properly decoded, identified and acted upon by a receiver. Based on the packet format, several key decisions vis-a-vis the packets are taken including but not restricted to the forwarding of the packet back to the network, the termination of the packet to the host or discard of the packet.

Known ways of dealing with late changes in packet format include delaying the deployment of such changes or not implementing them at all. This leads to possible compatibility issues and is not desirable in the long run. Typically, if a decision to implement changes is made, however, the changes are usually not restricted to key points in the design, but rather are made universally. While this may be a good approach for scratch designs, for existing cores, the design shock is propagated throughout and leads to extended design and verification effort, increasing the time to market. Furthermore, due to the occurrence of changes late in the development cycle, substantial risk is undertaken to make such radical changes while ensuring that the final design is fully functional and compatible.

A related problem area has been the implementation of several different architectures for reliable communication between nodes in a Metropolitan Area Network (MAN), in which the nodes are typically distributed over an area of several hundred kilometers. Important considerations in determining which architecture to implement include availability and recovery from failure, efficient bandwidth management, and the proper arbitration of newly inserted host traffic versus the traffic already on the ring.

Two architectures are particularly pervasive in the MAN space, the Spatial Reuse Protocol (SRP) architecture and the IEEE 802.17 Resilient Packet Ring (RPR) architecture. The SRP architecture began as a vendor-specific architecture on which several hardware implementations have been made. In order to promote the technology and to make it acceptable to multiple vendors, however, the SRP architecture became the seed over which the RPR architecture was developed.

The RPR architecture substantially enhances bandwidth sharing, resiliency, and the command, control and communication aspects of Metropolitan Area Networks by introducing new packet formats and advanced protocols. As the RPR architecture developed, several changes in frame structure made it backwardly incompatible with the SRP architecture. With products already available in SRP and with the RPR standard still evolving, the need has arisen to have dual architecture support.

A known approach to implementing RPR and SRP has been to implement the two architectures in a mutually exclusive way, with the hardware supporting only one set of features. Where both architectures are supported, the implementations have typically been cumbersome, complex and error prone with the features of one architecture affecting the other architecture. In the alternative, where only one implementation is supported, the advantages of having dual architectures are lost.

Other known solutions have been to allow the two architectures to coexist but to make them traverse the same pipes. This leads to possible interference between the two architectures in terms of integrity checks and packet formatting. It also makes the design convergence cycle longer because any design shocks due to frequent changes in the evolving architecture will affect the implementation of the other more stable architecture.

SUMMARY OF THE INVENTION

The present invention provides apparatus and methods to adapt to changes in packet formats in a clean and restricted way, keeping the bulk of the core isolated and immune from the risky aspects of changes while achieving full functional and inter-working capability. In an exemplary embodiment of the present invention, a translation apparatus is placed at the periphery of the core design, i.e., at the points of egress and ingress, where changes can be adopted while isolating the bulk of the core design from design shock and the ensuing verification effort. Similarly, a method is provided in accordance with the present invention for performing translation at the periphery of the core design at the points of egress and ingress.

Translation is the process of mapping either a new format to an old format at the point of ingress or mapping the old format to the new format at the point of egress. The translation mechanism isolates the core from any changes while the keeping it compatible and inter-workable.

The present invention is applicable to any packet advanced core or a network processor core. The present invention has manifold applications in networking as well as processor design areas where this scheme can be exploited to reduce shocks. In the area of network processors, the scheme is particularly useful since the core is isolated from any changes or reversals in the standards.

In a further aspect of the present invention, methods and apparatus are provided for mapping the Resilient Packet Ring (RPR) architecture over existing hardware implemented in accordance with the Spatial Reuse Protocol (SRP) architecture. In an exemplary embodiment, data path adaptors are used to adapt to fundamental changes in packet format and protection schemes in the two architectures.

The present invention allows the SRP architecture to be used as the established, fall-back implementation, and as the drivers to support the full capabilities of the RPR architecture become available and inter-operable, upgrading to the RPR architecture can be done in the field without changing hardware, i.e., with programming changes. In an exemplary embodiment, the present invention is used to map the IEEE 802.17 RPR architecture over existing SRP-based hardware. The exploitation of existing hardware to support dual architectures in a programmable way, provides "upgrade as you grow" capability in the field. With evolving standards and frequent changes, the programmability provided by the present invention is highly desirable.

These and other aspects of the present invention are described below.

BRIEF DESCRIPTION OF THE DRAWINGS

FIG. 2 shows an exemplary format of a packet header in accordance with the Spatial Reuse Protocol (SRP) architecture.

FIG. 3 shows an exemplary format of a packet header in accordance with the Resilient Packet Ring (RPR) architecture.

DETAILED DESCRIPTION

Figure 1:
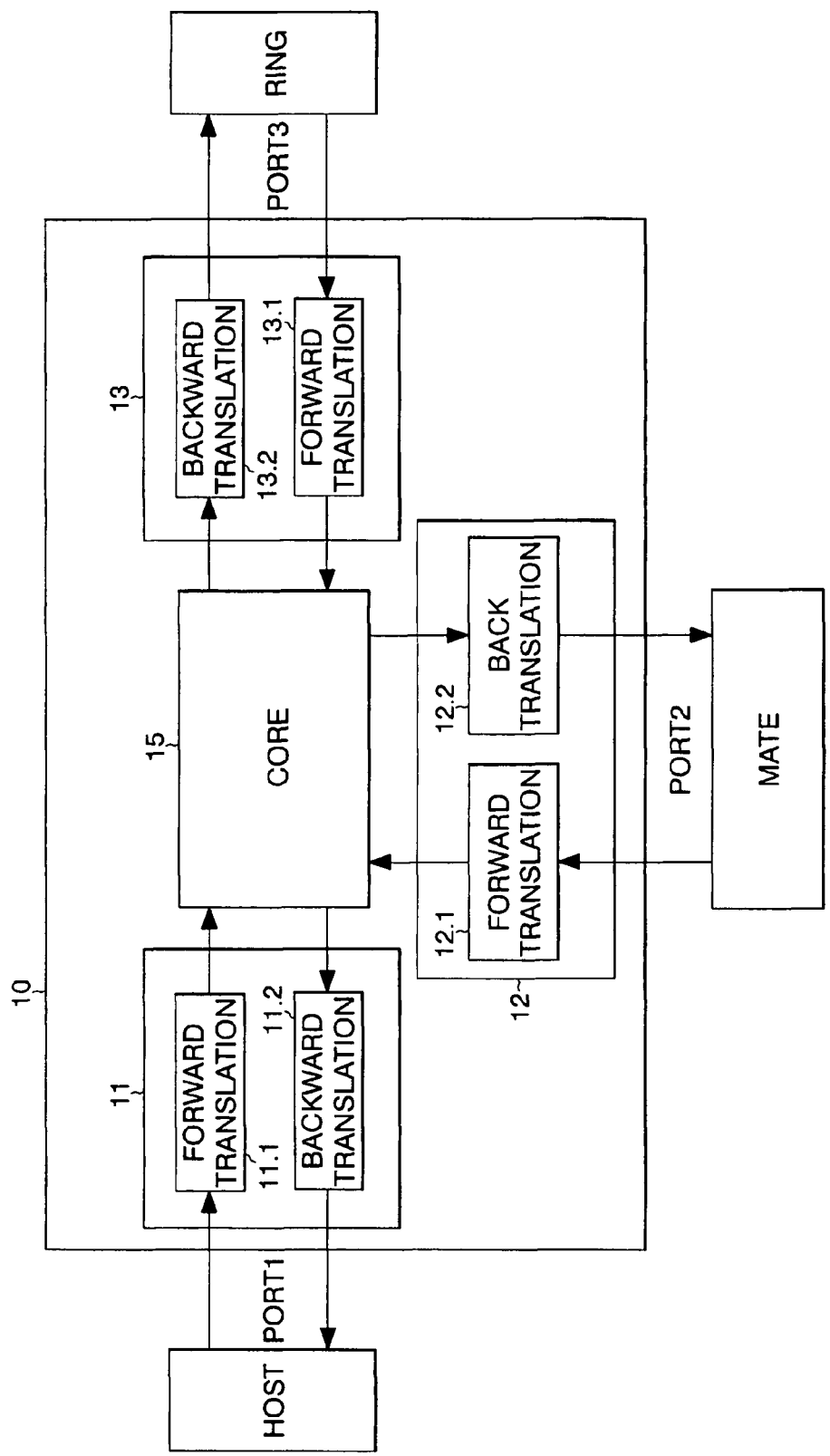
FIG. 1 is a block diagram of an exemplary embodiment of a network device in accordance with the present invention and FIG. 1A shows two such devices interconnected to form a full node in a ring network.

FIG. 1 is a block diagram of an exemplary embodiment of a network device 10 in accordance with the present invention. The device 10 can be, for example, a resilient ring processor implemented on one or more integrated circuits or on a circuit board.

The network device 10 comprises three, bidirectional ports (PORT1 to PORT3), for coupling to a host, a mate, and a ring, respectively. The network device 10 generally comprises three peripheral translation blocks 11-13, one for each port, and a core 15. The core 15 represents the bulk of the functionality and structure of the device 10. Thus, for example, if the device 10 provides RPR/SRP Layer 2 functionality, the core 15 contains the elements that perform Layer 2 functions such as checking, parsing, forwarding and terminating packets.

Figure 1A:
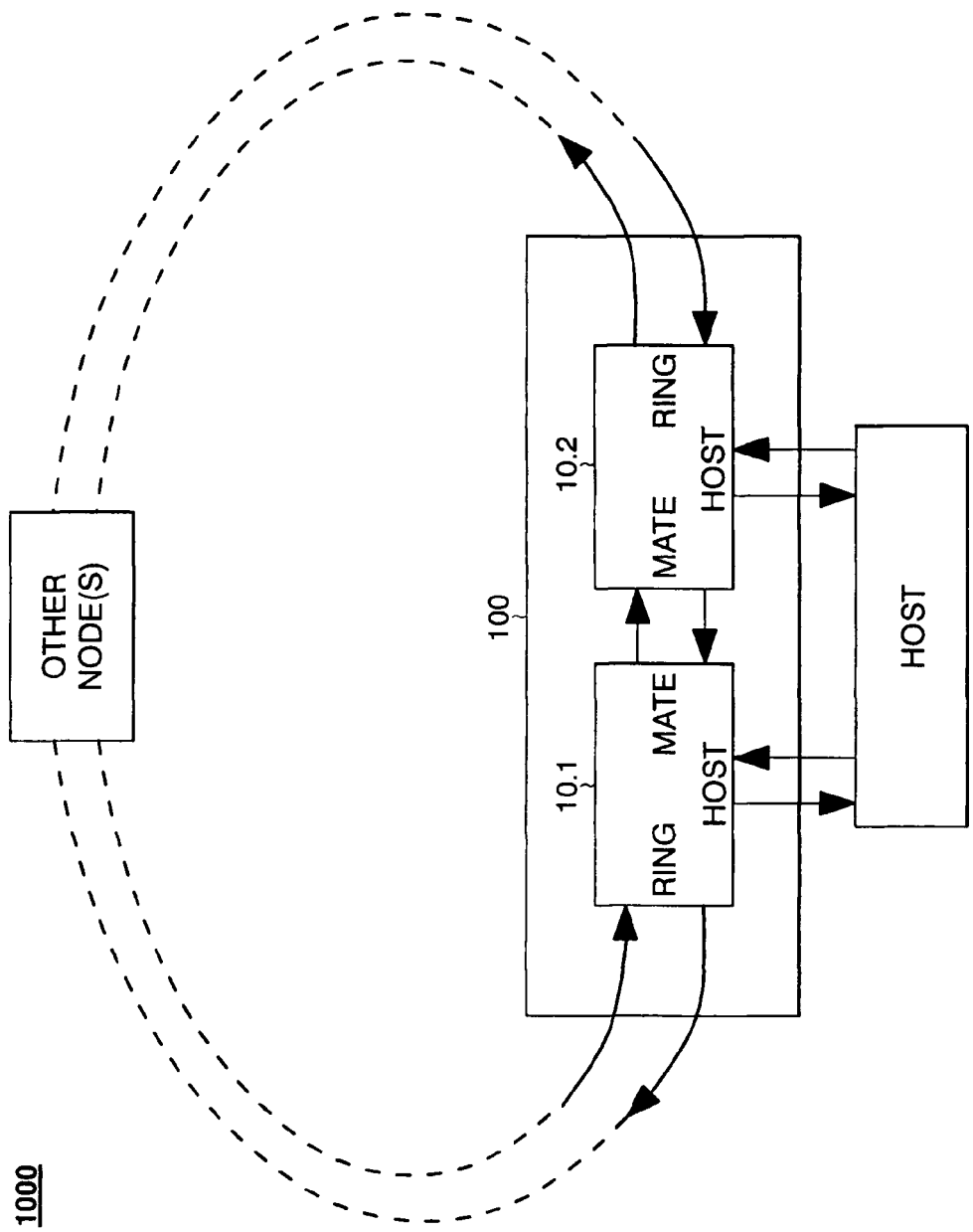

FIG. 1A shows two network devices 10.1, 10.2 coupled together to form a fully functional node 100 in a ring network 1000. The ring network 1000 comprises an inner ring, in which data is conveyed in a counter-clockwise direction and an outer ring in which data is conveyed in a clockwise direction. As shown, the node 100 comprises two access ports to the ring network 1000, two access ports to the host and a joint mutual access port between the two "mate" devices 10.1, 10.2. As with conventional network devices, the network devices of the present invention can also be used individually in half nodes (e.g., for termination functions).

While the implementation of the peripheral translation 11-13 is dependent on the communication protocol employed between the device 10 and the external elements (host, mate and ring), the implementation of the core 15 is generally independent of any such protocols. As such, the core 15 is isolated from any changes to the communications protocol, thereby minimizing the design shock caused by changes in the communications protocol.

FIG. 2 shows an exemplary format of a packet header 20, such as would be used in accordance with the Spatial Reuse Protocol (SRP) architecture. Table I describes the various fields of the header 20.

TABLE I

| Field | Bit positions | Description | Remarks |
|---|---|---|---|
| Time to Live | [15:8] | 8 bits indicating number of hops | same in RPR |
| Ring ID | [7] | 1 bit indicating inner or outer ring | same in RPR |
| Mode | [6:4] | 3 bit packet type identifier | 2 bits in RPR |
| Priority | [3:1] | 3 bit priority identifier | 2 bits in RPR |
| Parity | [0] | 1 bit indicating parity protection | used in all packets |

FIG. 3 shows an exemplary format of a packet header 30, such as would be used in accordance with the Resilient Packet Ring (RPR) architecture. Table II describes the various fields of the header 30.

TABLE II

| Field | Bit positions | Description | Remarks |
|---|---|---|---|
| Time to Live | [15:8] | 8 bits indicating number of hops | same in SRP |
| Ring ID | [7] | 1 bit indicating inner or outer ring | same in SRP |
| Mode | [6:5] | 2 bit packet type identifier | 3 bits in SRP |
| Fairness Eligible | [4] | 1 bit indicating rate control eligibility | n/a in SRP |
| Priority | [3:2] | 2 bit priority identifier | 3 bits in SRP |
| Wrap Eligible | [1] | 1 bit indicating eligibility to wrap | n/a in SRP |
| Parity | [0] | 1 bit indicating parity protection | used as parity only in usage packets; reserved in other packets |

As can be seen, the nine most significant bits of the SRP and RPR packet headers 20 and 30, respectively, are identical. Of the bits that are different, bit 0 is used for parity in all SRP packets whereas in RPR, parity is used only in special types of packets known as "usage" packets (described more fully below). Furthermore, bit 1 is used to indicate wrap eligibility, and bit 4 indicates fairness eligibility in the RPR packet header 30. The wrap eligibility bit of an RPR packet indicates whether the packet can wrap around at a node with wrap. At a node with wrap, wrap eligible packets that are received on one ring are sent out on the other ring. If a packet that is not wrap eligible (i.e., bit 1=0) arrives at a node with wrap, the packet is discarded. The fairness eligibility bit of an RPR packet indicates whether the packet is subject to rate control. If bit 4 is set, the bytes in the packet are counted towards determining congestion.

Another difference between the two architectures is that in SRP packets, three bits are used for priority whereas only two bits are used in RPR packets (see FIGS. 2 and 3, Tables I and II). In the SRP architecture, a determination is made as to whether a packet has high or low priority by comparing the numerical value (i.e., 0-7) of the three priority bits to the numerical value of a three-bit priority register. If the numerical value of the priority bits exceeds that of the priority register, the packet is considered to have high priority, otherwise it is considered to have low priority.

In the case of RPR packets, the lowest order priority bit, bit 1, is replaced by the wrap eligibility bit and bits 3 and 2 indicate priority with the values 11 and 10 indicating high priority, 01 indicating medium priority and 00 indicating low priority. In order to use the same logic to determine the priority of both SRP and RPR packets, the three-bit priority register in the case of RPR packets is programmed, in an exemplary embodiment of the present invention, to have a value of 011. By programming the priority register with the value 011, the value of the wrap eligibility bit becomes irrelevant to the priority determination, and packets with bits 3 and 2 set to 11 or 10 are treated as high priority, in accordance with the 2-bit priority scheme of the RPR architecture.

Although the differences in packet header format are seemingly small, they have significant implications for the implementation of each architecture. For the forwarding, termination, and discarding of packets to be carried out correctly, the packets must be correctly identified, and these seemingly minor modifications must be implemented throughout the design, leading to a major re-design and re-verification effort. Such efforts are further increased if the old and new architectures are to co-exist.

In order to avoid the above-described difficulties, the present invention provides a method of translating or "mapping" one packet header format into the other. In accordance with the present invention, two types of peripheral translation blocks are provided, referred to as "forward" and "backward" translation blocks. A forward translation block maps the new, RPR format to the old, SRP format, whereas a backward translation block maps the old, SRP format to the new, RPR format. As shown in FIG. 1, a forward translation block, 11.1, 12.1 and 13.1, is provided at each of the three ingress points of the peripheral translation blocks 11, 12 and 13 of the device 10, whereas a backward translation block, 11.2, 12.2 and 13.2, is provided at each of the three egress points of the peripheral translation blocks 11, 12 and 13 of the device 10.

Figure 4:
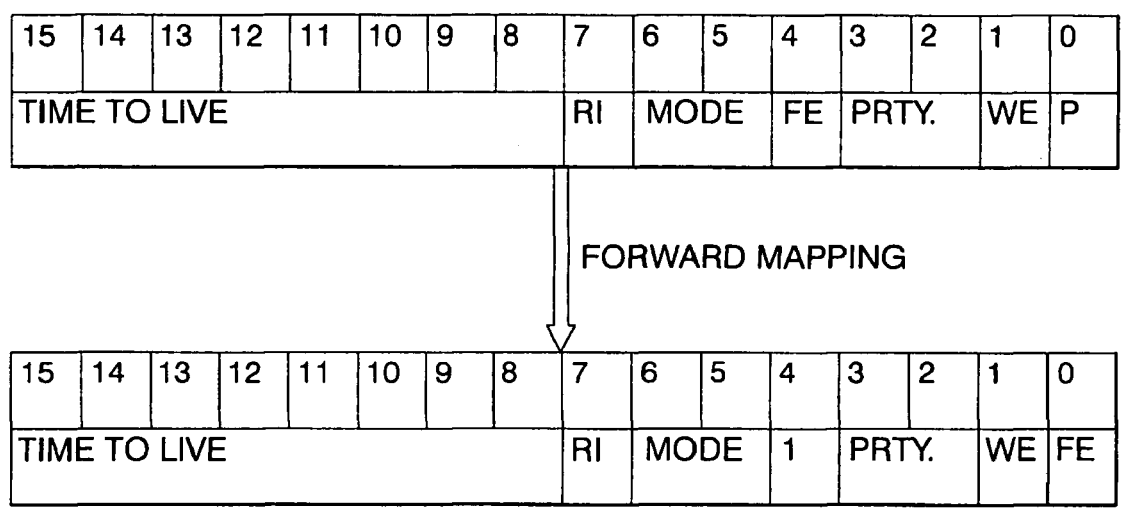
FIG. 4 illustrates a translation that is carried out by an exemplary embodiment of a forward mapping block in accordance with the present invention.

FIG. 4 illustrates the translation that is carried out by each of the forward translation blocks 11.1, 12.1, 13.1. As shown in FIG. 4, the contents of a packet header in the RPR format are rearranged as indicated. As such, the header of an RPR packet flowing through the core 15 of the exemplary embodiment will have the format shown in the lower half of FIG. 4.

Figure 5:
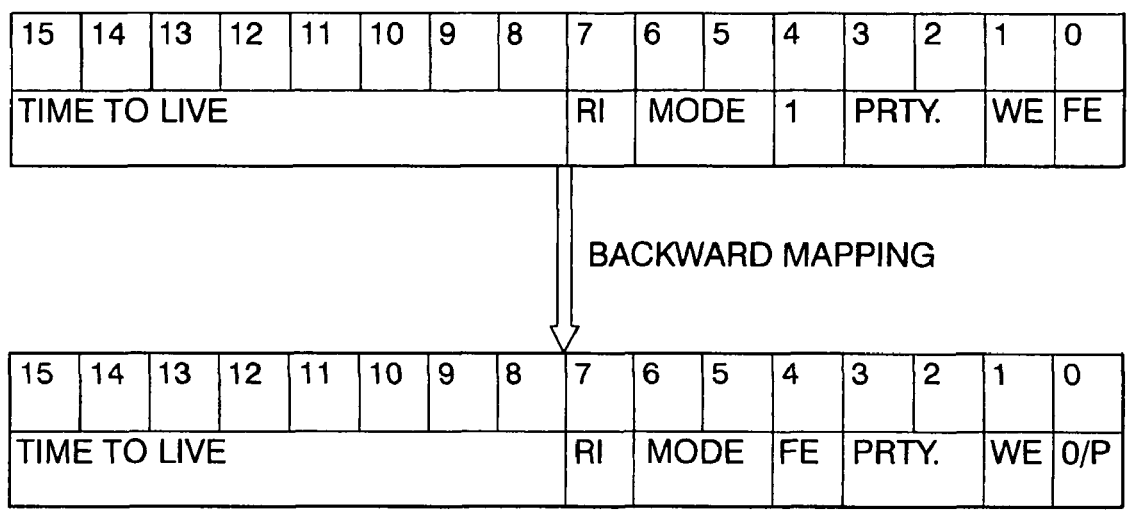
FIG. 5 illustrates a translation that is carried out by an exemplary embodiment of a backward mapping block in accordance with the present invention.

In the egress direction, the backward translation blocks 11.2, 12.2, and 13.2 carry out a backward translation in which the WE and FE bits return to their original positions. This backward mapping is illustrated in FIG. 5. Also if a packet is of the type requiring parity, such as a usage packet, the parity bit (bit 0) is regenerated by the backward translation block 11.2, 12.2, 13.2, otherwise, bit 0 is set to 0.

The translation blocks 11, 12, and 13 can be implemented in a variety of ways known to persons of ordinary skill in the art.

By thus performing format translation at the ingress and egress points, in accordance with the above-described exemplary embodiment of the present invention, the core 15 is isolated from packet format changes while keeping the function of the device 10 compatible with more than one established standard and thus capable of inter-working with other devices that adhere to those standards. Any design shocks are absorbed at the peripheral translation blocks without affecting the core.

The forward and backward translation of SRP and RPR packet headers is presented herein to illustrate the present invention, which is not limited to these specific formats. The exemplary embodiment shown is only one application of the present invention which can be extended to any network, any protocol, or any port.

In addition to the above-discussed packet header format differences, there are additional differences in the data link layers (or OSI Layer 2) of the SRP and RPR architectures. These are addressed by another aspect of the present invention described below.

As discussed above, the two architectures have a substantial core functionality that is common to both and which is independent of any changes in packet format. Because the packet differences are at Layer 2, substantial adaptation can be done at the periphery of each network device, including adaptation that includes pipe changes such as adding processing logic in the data path for staging and performing error correction related functions (e.g., error correction code generation and checking).

The aforementioned differences in Layer 2 functions between the SRP and RPR architectures will now be discussed with reference to FIGS. 6A and 6B.

Figure 6A:
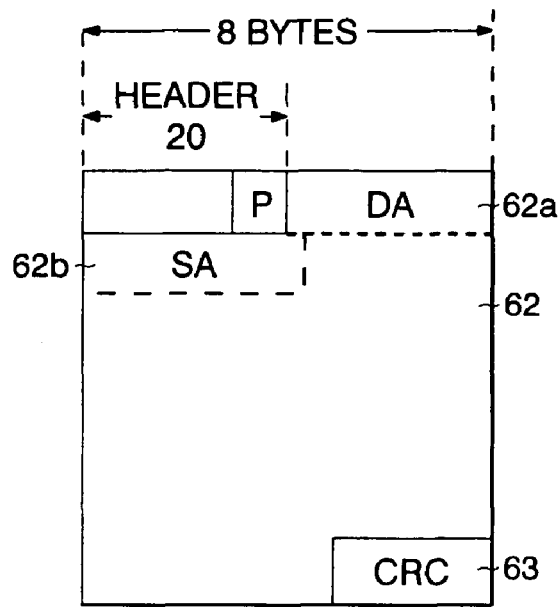
FIGS. 6A and 6B illustrate the general formats of SRP and RPR packets, respectively.

FIG. 6A illustrates the general format of an SRP packet 61. As described above in connection with FIG. 2, the packet header 20 is protected by parity (bit 0). The rest of the packet payload 62, including the Layer 2 addresses 62a, 62b following the header, is protected by a cyclic redundancy code (CRC) 63.

Figure 6B:
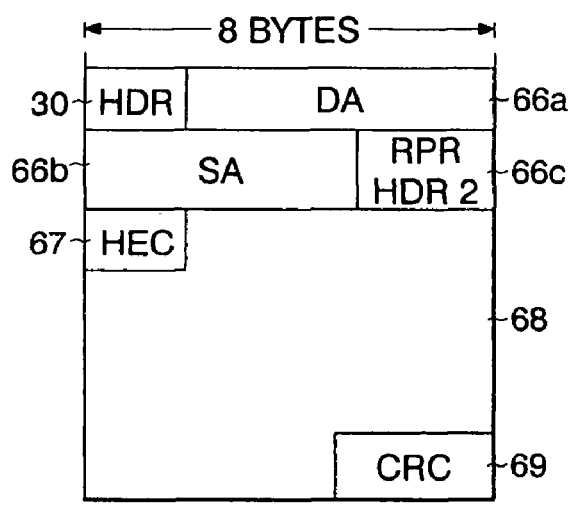

FIG. 6B shows the general format of an RPR packet 65. The header 30, described above in connection with FIG. 3, the Layer 2 addresses 66a, 66b, and the two bytes that follow, also referred to as the "RPR Header 2" 66c, are protected by a two-byte Header Error Correction (HEC) code 67. The balance of the packet payload 68 is protected by a CRC 69.

The Header Error Correction (HEC) integrity check mechanism used in the RPR architecture ensures greater routing- and addressing-related integrity by isolating the first 16 bytes of the header (which contains the routing and addressing information) from the packet payload 68, which is protected by the CRC check mechanism. Moreover, the correction capability of HEC allows a packet to be forwarded despite the presence of an erroneous bit. As a result, discarding an RPR packet because of single bit errors in the routing information is rare. This feature is desirable in the transport of constant rate voice traffic where an imperfect packet is better than an absent packet for the regeneration of voice at the termination point. Because of the real-time nature of voice transmission and TDM-related traffic, the retransmission mechanism available in packets is not possible. The use of HEC thus enables the placement of voice, video and packet traffic on the same ring.

Second, in the RPR architecture, because of the addition of the two-byte RPR Header 2 and the HEC code which is also two bytes, the position of the Layer 2 second level packet type identifiers is shifted by four bytes relative to their position in the SRP architecture. The packet type identifiers comprise two bytes at the beginning of the packet payload 62, 68 which identify the packet type for Layer 3. For packet types that are native to the ring (e.g., protection, usage or control packet types) these two bytes further identify which packet (e.g., topology, OAM, etc. for control type packets).

The remaining differences between the two architectures are related to packet switching decisions and in the implementation of advanced rate control features through the support of multi-choke algorithms enabled by the addition of various types of usage packets. A usage packet is a rate-controlling packet that conveys the rates between nodes so that congestion and choke points can be identified and appropriate rates adjusted in terms of new traffic on the node. The usage packet links all nodes on a ring for efficient and reliable running of the rate control algorithms, and in particular, the arbitration of forwarded versus new traffic (i.e., traffic inserted at each node) for continued access to the ring. For legacy and backwards compatibility reasons, usage packets are the same in both the RPR and SRP architectures. As described above in connection with FIG. 3, usage packet headers are still parity protected in the RPR architecture.

An exemplary embodiment of the present invention will now be described which addresses the above-described changes allowing the adaptation and co-existence of the two incompatible architectures. An aspect of the present invention lies in the clean delineation between the core functionality, which is independent of packet format and error protection differences, and the provision of programmable adaptation at the lines coupling the various ports and the core.

Figure 7:
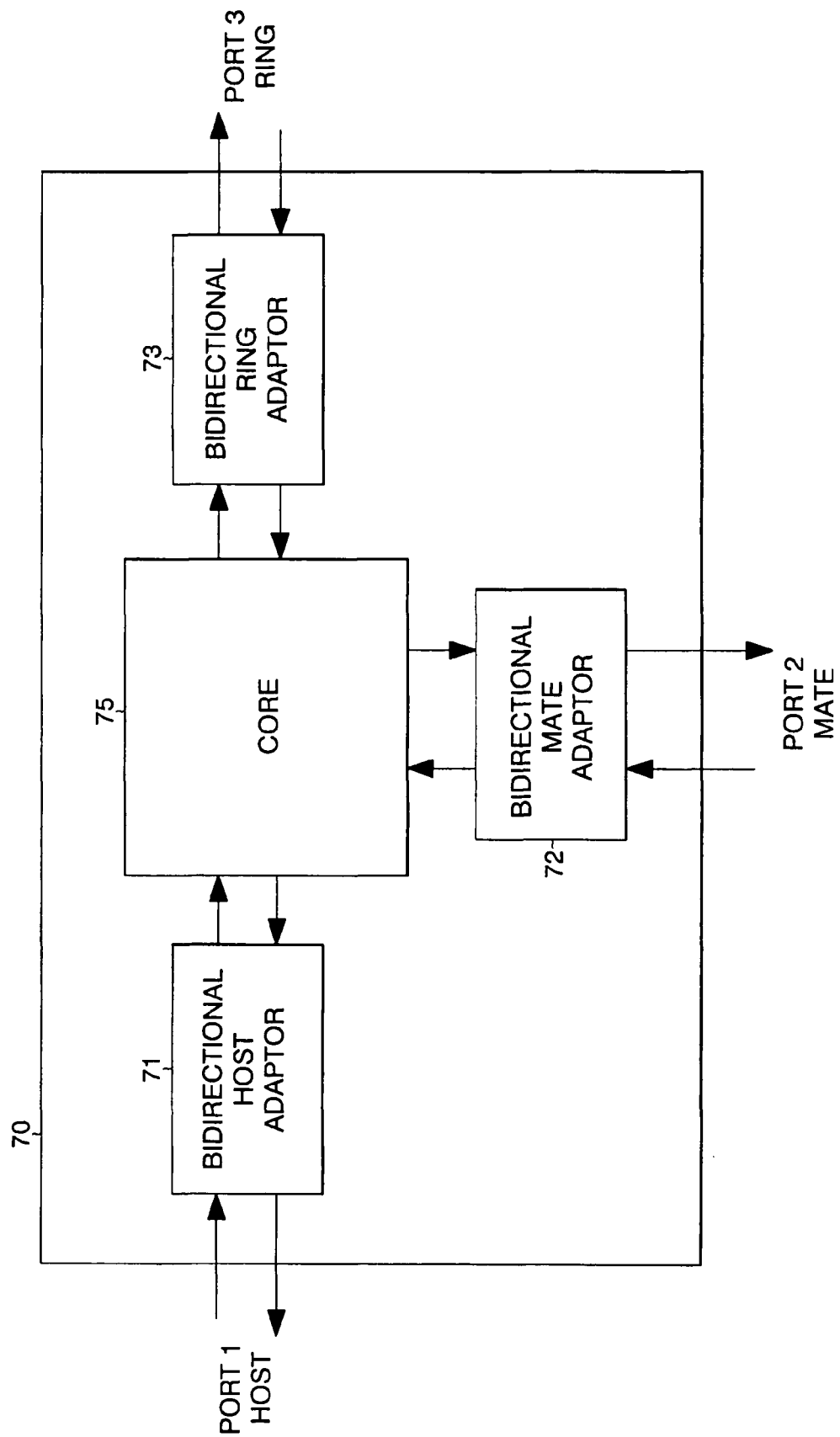
FIG. 7 is a block diagram of an exemplary embodiment of a network device in accordance with the present invention.

In accordance with an exemplary embodiment of the present invention, line adaptation of the two architectures is provided by a bidirectional data path adaptor at each of the three ports of a network device. FIG. 7 is a block diagram of an exemplary embodiment of a network device 70 in accordance with the present invention. The network device 70 has three, bidirectional ports (PORT1 to PORT3), for coupling to a host, a mate network device, and a ring network, respectively. The network device 70 generally comprises three bidirectional data path adaptors 71, 72 and 73, one for each port, and a core 75. The core 75 represents the bulk of the functionality and structure of the device 70.

The exemplary device 70 incorporates the functionality of the device 10 described above in connection with FIG. 1 and further addresses the additional differences described above between the SRP and RPR architectures.

While the implementation of the data path adaptors 71-73 is dependent on the communication protocol employed between the device 70 and the external elements (host, mate and ring), the implementation of the core 75 is generally independent of any such protocols. As such, the core 75 is isolated from any changes to the communications protocol, thereby minimizing the design shock caused by changes in the communications protocol.

Although the three adaptors 71-73 have substantial similarities, because of functional differences due their corresponding ports, the three adaptors are not logically equivalent in all modes. Exemplary embodiments for the adaptors 71-73 will now be described with reference to FIGS. 8 and 9.

Figure 8:
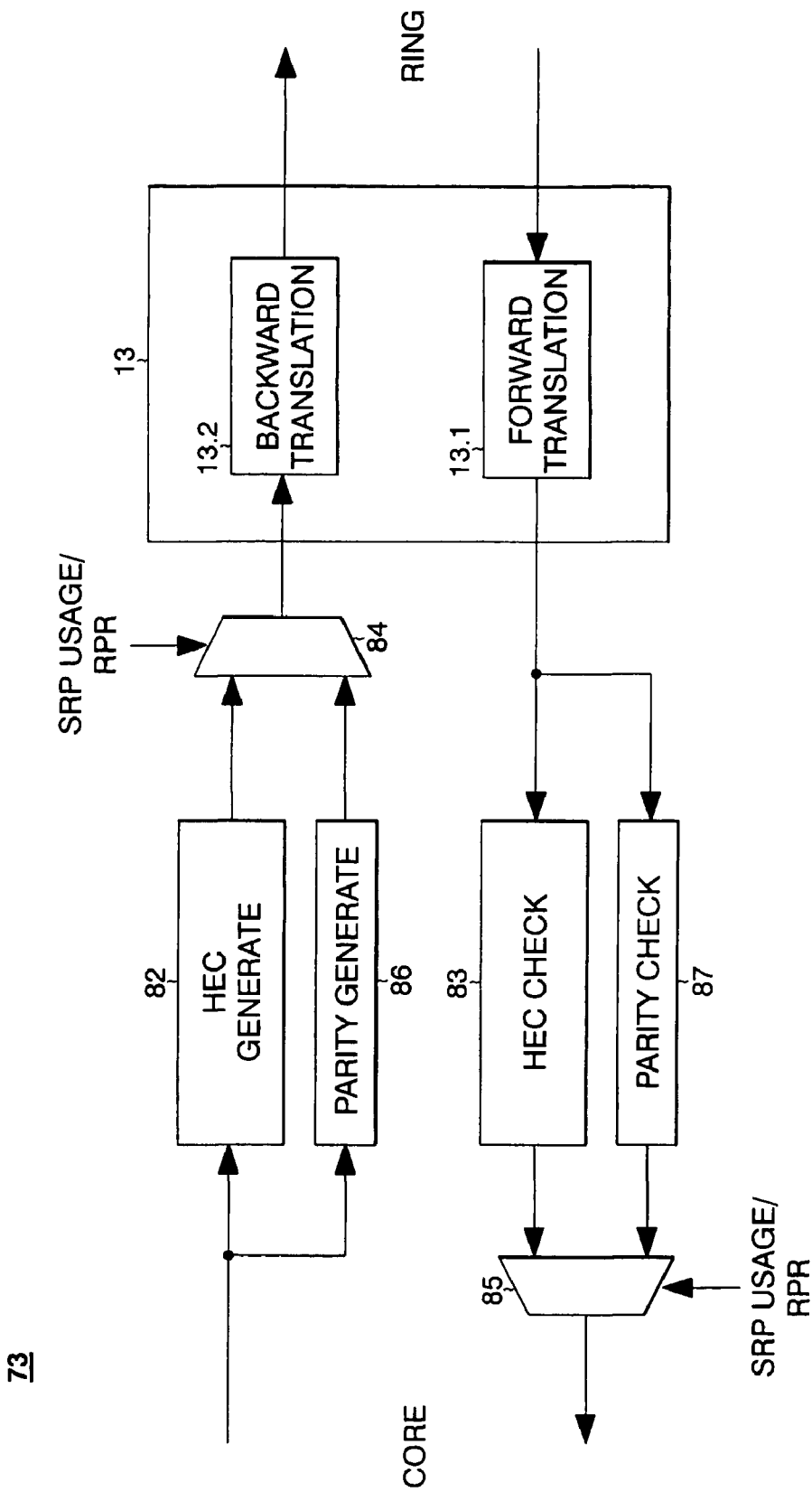
FIG. 8 shows a block diagram of an exemplary data path adaptor for the ring port of the device of FIG. 7.

FIG. 8 shows a block diagram of an exemplary embodiment of the data path adaptor 73 for the ring port of device 70. The adaptor 73 interfaces with the network (ring) on one side, and the core 75, which, as discussed, is packet format independent. The adaptor 73 incorporates the translation block 13 for mapping between the different packet header formats at the ingress and egress points, as described above. The adaptor 73 also includes a HEC generator 82 and a parity generator 86 in the egress data path and a HEC checker 83 and a parity checker 87 in the ingress data path. The HEC checker 83 can discard packets containing more than one error and can correct (or discard) single-bit HEC errors. In an exemplary embodiment, single-bit error correction entails the generation of 128 unique syndromes in order to detect one of 128 correctable errors.

The parity blocks 86, 87 are arranged in bypass paths around the HEC blocks 82, 83. The bypass paths are used for SRP traffic or usage packets in RPR. This feature allows the two architectures to coexist without interfering with each other. The blocks 82, 83 or the by-pass paths are selected by selectors 84, 85, respectively. Consistent with the discussion above with reference to FIGS. 6A and 6B, the HEC blocks 82, 83 operate on the first 16 bytes of the RPR packets whereas the parity blocks 86, 87 operate on the header of the SRP, or RPR usage packets.

The selectors 84, 85 can be implemented with 2:1 multiplexers, for example and can be controlled, for example, by a programmable bit in a register (not shown) and/or logic (not shown) that detects the presence of a usage packet.

The mate port data path adaptor 72 is similar to the ring data path adaptor 73. A notable difference is that single-bit error correction and the ability to discard packets is absent in the mate data path adaptor. In the out bound data path (i.e., from the core to the port), the HEC is regenerated in the mate port data path adaptor 72 as in the ring port data path adaptor 73.

It should be noted that the CRC mechanism is the same for both SRP and RPR architectures and can thus be shared; i.e., the CRC generating and checking functions can be implemented in the core 75 of the network device 70. As discussed above with reference to FIGS. 6A and 6B, the CRC 63 covers the packet payload 62 of an SRP packet and the CRC 69 covers the packet payload 68 of an RPR packet. Since the first 16 bytes of the RPR header are not covered by the CRC 69 and the header 20 of the SRP packet and the HEC 67 of the RPR packet are both two bytes each, the boundaries of the payloads 62 and 68 are similar, thus allowing sharing of the same CRC checking and generating blocks. These blocks can be implemented in conventional ways.

Figure 9:
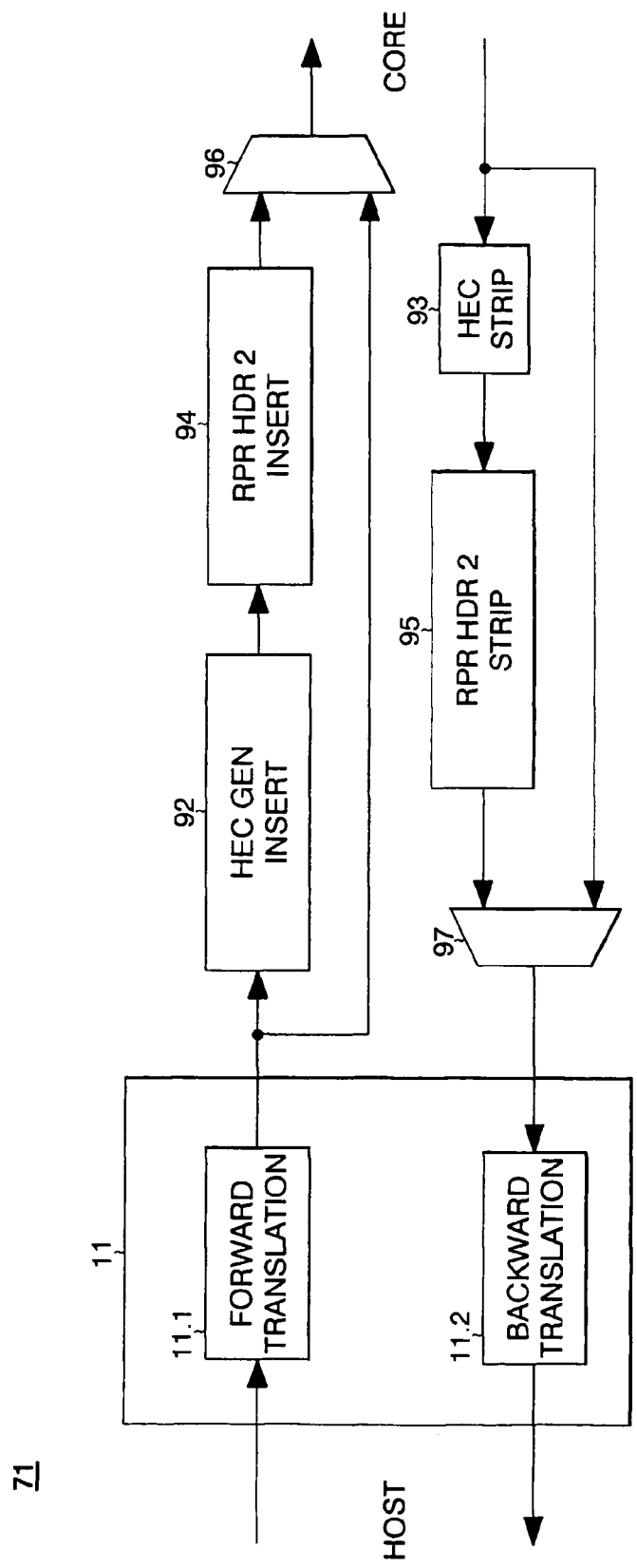
FIG. 9 shows a block diagram of an exemplary data path adaptor for the host port of the device of FIG. 7.

FIG. 9 shows a block diagram of an exemplary embodiment of the data path adaptor 71 for the host port of the device 70. The host port is a termination point for Layer 2 in the interface between Layer 2 and Layer 3. In the pathway from the core to the host port, the HEC and the RPR Header 2 are stripped from each packet at blocks 93 and 95, respectively. Conversely, in the pathway from the host port to the core, the HEC and the RPR Header 2 are inserted into each packet at blocks 92 and 94, respectively. Additionally, the adaptor 71 incorporates the translation block 11 for mapping between the different packet header formats at the ingress and egress points, as described above.

As with the adaptors for the ring and mate ports, the adaptor 71 also includes, for each data path, a bypass path around the HEC blocks 92-95. The bypass paths are used for SRP traffic and usage packets. This feature allows the two architectures to coexist without interfering with each other. The HEC blocks 92-95 or the by-pass paths are selected by selectors 96, 97, respectively. The selectors 96, 97 can be implemented with 2:1 multiplexers and can be controlled by a programmable bit in a register (not shown) and/or suitable logic (not shown) for detecting the processing of a usage packet.

The various protection and error detection/correction devices (e.g., CRC/HEC/parity generator/checkers) described above can be implemented in conventional ways.

It is to be understood that while the invention has been described above in conjunction with preferred specific embodiments, the description is intended to illustrate and not to limit the scope of the invention, as defined by the appended claims. Indeed, various modifications of the invention in addition to those described herein will become apparent to those skilled in the art from the foregoing description and the accompanying figures. Such modifications are intended to fall within the scope of the appended claims.

It is further to be understood that all values are to some degree approximate, and are provided for purposes of description.

The disclosures of any patents, patent applications, and publications that may be cited throughout this application are incorporated herein by reference in their entireties.

What is claimed is:

1. A data communications apparatus for communicating in accordance with two or more communications protocols, comprising:
   a core portion, the core portion being substantially independent of the two or more communications protocols; and
   a peripheral portion, the peripheral portion being coupled to the core portion and including:
   an ingress, and
   an egress,
   wherein the peripheral portion is configurable to receive at the ingress data communications in accordance with the two or more communications protocols and to transmit at the egress data communications in accordance with the two or more communications protocols, wherein the peripheral portion includes a translation device, wherein the translation device translates a first data format into a second data format, wherein the first and second data formats are the spatial reuse protocol (SRP) data format and the resilient packet ring (RPR) data format, respectively, or the RPR data format and the SRP data format, respectively.

2. The apparatus of claim 1, wherein the translation device selectively adapts to one of a first error protection scheme and a second error protection scheme.

3. The apparatus of claim 2, wherein the first error protection scheme comprises parity and the second error protection scheme comprises error correction.

4. A method for communicating in accordance with two or more communications protocols, comprising the steps of:
   providing a data communication device having a core portion, which is substantially independent of the two or more communications protocols, and a peripheral portion, which is coupled to the core portion and includes an ingress and an egress;
   receiving at the ingress data communications in accordance with the two or more communications protocols; and
   transmitting at the egress data communications in accordance with the two or more communications protocols, wherein the receiving step comprises the step of translating a first data format into a second data format, and wherein the transmitting step comprises the step of translating the second data format into the first data format, wherein the first data format is the resilient packet ring (RPR) data format and the second data format is the spatial reuse protocol (SRP) data format.

5. The method of claim 4, wherein the receiving step comprises the step of adapting to one of a first error protection scheme and a second error protection scheme.

6. The method of claim 5, wherein the first error protection scheme comprises parity and the second error protection scheme comprises error correction.

* * * * *